US011870766B2

(12) United States Patent
Carmon et al.

(10) Patent No.: US 11,870,766 B2
(45) Date of Patent: Jan. 9, 2024

(54) INTEGRATION OF LEGACY AUTHENTICATION WITH CLOUD-BASED AUTHENTICATION

(71) Applicant: MICROSOFT TECHNOLOGY LICENSING, LLC., Redmond, WA (US)

(72) Inventors: Avraham Carmon, Redmond, WA (US); Joseph Isenhour, Redmond, WA (US); Aakashi Kapoor, Seattle, WA (US); Young Moon Ko, Sammamish, WA (US); Sagar Bholanath Saha, Renton, WA (US); Steven Syfuhs, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 308 days.

(21) Appl. No.: 17/123,622

(22) Filed: Dec. 16, 2020

(65) Prior Publication Data

US 2022/0191185 A1   Jun. 16, 2022

(51) Int. Cl.
*H04L 29/06* (2006.01)
*H04L 9/40* (2022.01)

(52) U.S. Cl.
CPC ...... *H04L 63/0807* (2013.01); *H04L 63/0236* (2013.01); *H04L 63/102* (2013.01); *H04L 63/20* (2013.01)

(58) Field of Classification Search
CPC ............. H04L 63/0807; H04L 63/0236; H04L 63/102; H04L 63/20
See application file for complete search history.

(56) References Cited

U.S. PATENT DOCUMENTS

| | | | |
|---|---|---|---|
| 2004/0098595 A1* | 5/2004 | Aupperle | H04L 63/0815 713/185 |
| 2005/0108575 A1 | 5/2005 | Yung et al. | |
| 2010/0001833 A1 | 1/2010 | Alexander et al. | |
| 2013/0318569 A1* | 11/2013 | Canning | G06F 21/335 726/4 |
| 2015/0188922 A1* | 7/2015 | Parmar | G06F 21/33 726/29 |
| 2018/0337914 A1* | 11/2018 | Mohamad Abdul | H04L 9/3213 |

(Continued)

FOREIGN PATENT DOCUMENTS

WO   2019243429 A1   12/2019

OTHER PUBLICATIONS

"International Search Report and Written Opinion Issued in PCT Application No. PCT/US21/058872", dated Feb. 8, 2022, 13 pages.

*Primary Examiner* — Noura Zoubair (57) ABSTRACT

An identity provider of a cloud computing service provides authentication for on-premise applications that is subject to a legacy authentication protocol that differs from the cloud-based network authentication protocol used by the identity provider. The identity provider generates a security ticket for use to gain access to the on-premise application. The security ticket is embedded in a security token associated with a cloud-based network authentication protocol. A client application seeking access to the on-premise application extracts the embedded security ticket from the security token which is then used to access the on-premise application via a legacy authentication protocol.

20 Claims, 4 Drawing Sheets

(56) References Cited

U.S. PATENT DOCUMENTS

2019/0007409 A1 1/2019 Totale et al.
2020/0371829 A1* 11/2020 Momchilov ........ G06F 9/45558

* cited by examiner

INTEGRATION OF LEGACY AUTHENTICATION WITH CLOUD-BASED AUTHENTICATION

BACKGROUND

An on-premise application is a computer program (e.g., API, application, service) that runs on a computer at the premise of a user or organization using the program. An on-premise application is typically associated with a domain-based network. A domain-based network is a configuration of computing resources (e.g., servers, applications, storage, networks) and user accounts in which the user accounts and shared computing resources are registered in a centralized database typically located in a domain controller. The domain controller authenticates the users requesting access to a shared resource using a legacy authentication protocol.

Cloud computing provides on-demand delivery of computing resources, such as servers, databases, storage, software, analytics, etc., over the Internet from virtually any Internet-connected device and from any location. Cloud computing is beneficial for reducing Information Technology (IT) infrastructure costs incurred in managing and maintaining a local data center and IT systems. Additionally, cloud computing provides scalability thereby allowing an organization to increase or decrease its IT resources as needed.

A cloud computing service typically contains an identity provider that utilizes a cloud-based authentication protocol to authenticate the identity of users seeking access to a shared resource from a publicly-accessible network. The cloud-based authentication protocol may utilize a more rigorous protocol that is not compatible with the legacy authentication protocols used in domain-based networks.

As cloud computing become more ubiquitous, the need for integrating the on-premise applications into a cloud computing service becomes more apparent. However, the integration of the on-premise applications into a cloud computing service presents challenges. In some cases, the on-premise application may not be able to be moved to the cloud. Regulatory compliance restrictions found in some industries may prevent an on-premise application from being hosted in a cloud computing service. In addition, the on-premise application may be tied to a particular legacy authentication protocol that is not supported by the cloud-based authentication protocol.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A cloud computing service utilizes an identity provider to authenticate the identities of the users or client applications seeking to access on-premise applications that are subject to a legacy authentication protocol. The cloud computing service utilizes a cloud-based network authentication protocol that is incompatible with the legacy authentication protocol. In one aspect, the legacy authentication protocol is based on the Kerberos authentication protocol and the cloud-based network authentication protocol is based on OpenIdConnect (OIDC) and OAuth2.0 ("OAuth/OIDC").

The identity provider of the cloud computing service generates a Kerberos security ticket upon successful authentication of the client application. An access token generated in accordance with the OAuth/OIDC protocol is generated by the identity provider with the Kerberos security ticket embedded in it. The client application or agent extracts the Kerberos security ticket from the access token and uses the legacy authentication protocol to obtain access to the on-premise application.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

The subject matter disclosed herein pertains to a cloud-based identity provider that manages the authentication and authorization of on-premise applications in a manner that does not alter the authentication process of the on-premise application, does not alter the on-premise application itself and enables the on-premise application to trust the authenticated users of the cloud computing service.

Figure 1:
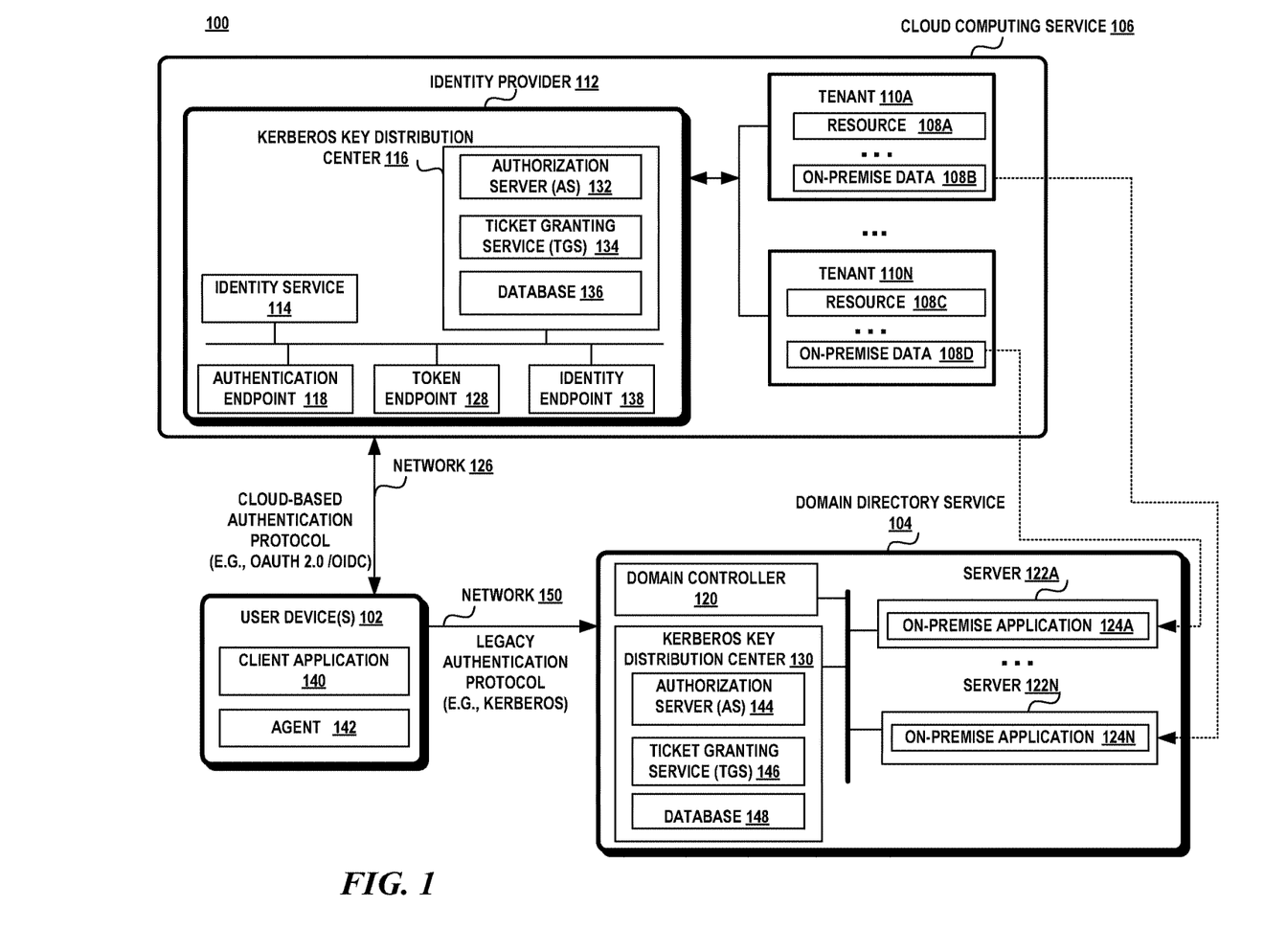
FIG. 1 is a block diagram illustrating an exemplary system for integrating a legacy authentication protocol with a cloud-based authentication protocol.

FIG. 1 illustrates a block diagram of an exemplary system 100. In one aspect of the subject matter disclosed herein, the system 100 includes a user device 102 having a client application 140 and/or agent 142, communicatively coupled to a domain directory service 104 through network 150, and a cloud computing service 106 through network 126.

A cloud computing service 106 is a computing environment for enabling convenient, on-demand network access to a shared pool of configurable computing resources that can be rapidly generated and released with nominal management effort or interaction with a provider of the service. The cloud computing service 106 allows a cloud consumer to obtain computing resources, such as networks, network bandwidth, servers, processing memory, storage, applications, virtual machines, and services as a service on an elastic and sometimes temporary basis.

In one aspect, a cloud computing service 106 hosts resources 108A-108D ("108") of multiple tenants 110A-110N ("110"). A tenant 110 is a directory that is associated with an enterprise, organization, group, user or entity that subscribes to the cloud computing service 106. A tenant 110 contains resources, such as virtual machines, applications, application programming interfaces (APIs), web APIs, storage accounts, services, etc. that are grouped into a subscription. A subscription is an object that represents a folder where the resources reside. A tenant 110 may have many subscriptions. A resource 108 is an entity that is managed by the cloud computing service 106.

The cloud computing service 106 hosts the tenant's subscriptions and controls access to the resources contained within a subscription. A subscription may be fee-based or free and lasts for a designated length of time. Examples of a cloud computing service include without limitation, Microsoft Azure®, Google Cloud Platform™ service, iCloud®, and the like.

The cloud computing service 106 includes servers that may be part of a data center that provides distributed computing services. A data center may provide pooled resources on which customers or tenants can dynamically provision and scale applications as needed without having to add servers or additional networking. The data center can be configured to communicate with local computing devices used by cloud consumers including personal computers, mobile devices, embedded systems, or other computing devices. Within the data center, computing devices can be configured as servers, either as standalone devices or individual blades in a rack of one or more other server devices. A tenant may initially use one virtual machine on a server to run an application. The data center may activate additional virtual machines on a server or other servers when demand increases, and the data center may deactivate virtual machines as demand drops.

A data center may be an on-premise, private system that provides services to a single enterprise user or may be a publicly (or semi-publicly) accessible distributed system that provides services to multiple, possibly unrelated customers and tenants, or may be a combination of both. Further, a data center maybe contained within a single geographic location or may be distributed to multiple locations across the globe and provide redundancy and disaster recovery capabilities. For example, the data center may designate one virtual machine on a server as the primary location for a tenant's application and may activate another virtual machine on the same or another server as the secondary or back-up in case the first virtual machine or server fails.

A tenant 110 may communicate with other devices, including each other or with devices located outside the cloud computing service 106 via a network 126, such as the internet. In one example, a tenant 110 may communicate with other devices via assigned network addresses, such as an assigned internet protocol (IP) address. In one example, a user of a user device 102 can log into a tenant 110 and access resources 108. In some examples, the resources 108 are available to authorized users, and the user may have further restrictions via permissions from a set of permission levels to each authorized user for each resource in the cloud computing service 106.

The cloud computing service 106 utilizes an identity provider 112 to authenticate and authorize a user or application to access the resources of a tenant. The identity provider 112 includes an identity service 114, a Kerberos key distribution center 116, an authentication endpoint 118, a token endpoint 128, and an identity endpoint 138. The identity provider 112 is configured to support web-based services that apply REST (REpresentational State Transfer) API (Application Programming Interface) interfaces. The identity provider 112 applies protocols that can work with web-based services such as authentication/authorization protocols including Security Assertion Markup Language (SAML), OpenIDConnect (OIDC), an identity layer on top of the OAuth protocol, and Web Services Federation (WS-Federation).

The client application 140 communicates with the cloud computing service 106 through REST APIs. A REST API is used to request information or access to a resource from the cloud computing service 106 using a HyperText Transfer Protocol (HTTP) method. The cloud computing service 106 responds by returning an HTTP response. The REST APIs are transmitted to an endpoint of the cloud computing service 106. An endpoint is a port that connects a device to a service hosted by the cloud computing service 106. The endpoint is addressed by a uniform resource locator (URL) that the client application 140 uses to access a resource or service hosted by the cloud computing service 106. The cloud computing service 106 may have multiple endpoints 120. In one aspect, the endpoints 120 are API endpoints, each of which are configured to receive requests through a designated REST API. There is an authentication endpoint 118 that receives and processes authentication requests, a token endpoint 128 that receives and processes token requests, and an identity endpoint 138 that handles registration of tenants and users.

The domain directory service 104 is an organization of resources of a domain-based network that provides authentication and authorization to applications, file services, printers and other on-premises resources. The domain directory service 104 includes a domain controller 120 that typically services the authentication/authorizations requests of all the users and computers in the domain-based network. The domain directory service 104 includes one or more servers 122A, 122N ("122"), each of which may host a respective on-premise application 124A, 124N ("124"). An on-premise application (e.g., web API, application, service) resides in a location outside of the cloud computing service 106 and requires authentication/authorization through a legacy authentication protocol.

In one aspect, the resources of the cloud computing service 106 may be physically stored in the cloud computing service, such as resource 108A, 108C, and other resources may be stored at the premise of the customer with on-premise data 108B, 108D, stored in the cloud computing service 106. The on-premise data 108B, 108D includes an application object that describes the authentication protocol used to access to the on-premise application, a service principal name associated with the on-premise application, cryptographic keys, and other data described in more detail below.

The domain directory service 104 may use legacy authentication protocols such as Kerberos and New Technology Local Area Network Manager (NTLM) for authentication and Lightweight Directory Access Protocol (LDAP) to query and modify resources in the domain directory service.

In one aspect, the domain directory service 104 utilizes the Kerberos computer network authentication protocol. Kerberos relies on symmetric key cryptography and access tickets to verify an identity. Kerberos relies on a trusted third party, a Key Distribution Center (KDC) 130, to verify an identity. The Key Distribution Center 130 includes an authentication server (AS) 144, a ticket granting server (TGS) 146, and a database 148 having IDs and passwords of users.

In the Kerberos protocol, a user/client application requests access to a resource through an authentication server. The request is partially encrypted with a secret key, the user's password. The user's password is a shared secret between the user and the authentication server. The authentication server decrypts the request and if the password is correct, the authentication server creates a ticket-granting ticket (TGT) and encrypts it with the ticket granting server's secret key. The TGS's secret key is shared between the authentication server and the TGS.

The user sends the TKT to the TGS where the TGS decrypts it with the shared secret key. If the TKT is valid, the TGS issues a service ticket to the user. The user/client application sends the service ticket to the server associated with the resource. The server decrypts the service ticket with the secret key shared with the TGS. If the secret keys match, the file server allows the user to access the resource.

In one aspect, the identity provider 112 uses the Oauth/OIDC protocol to authenticate a user/application and to authorize access to a resource. Oauth2.0 is a standardized protocol used to convey authorization decisions across a network of web-enabled applications and OIDC is a layer that is used with OAuth2.0 that authenticates the person or application requesting a login session.

The Oauth/OIDC protocol does not use passwords to perform authentication or authorization. Instead, the Oauth/OIDC protocol uses an access token and an identifier (ID) token. The ID token is a JSON web token (JWT) that contains claims about the identity of the authenticated user/application. A claim is a statement that one subject makes about itself or another subject. The statement may be a name, identity, key, group, privilege or capability. Claims are issued by an identity provider and given one or more values. The ID token is securely sent in HTTP requests. The ID tokens are signed, but they are not encrypted. The signature is used to prove that the ID token is authentic.

The access token is used to grant access to authorized resources. The access token contains claims that are used to identify the granted permissions to a resource. The access token is signed and not encrypted.

In one aspect, the identity provider 112 acts as the trusted party in the Kerberos realm and issues Kerberos tickets. As such, the identity provider 112 includes a Kerberos key distribution center 116 that contains an authentication server 132, a ticket granting server 134, and a database 136 of passwords/secret keys and identifiers.

The user device 102 may facilitate authentication with the identity provider 112 using the client application 140 and/or an agent 142. In one aspect, the client application 140 may be configured to interact with the identity provider 112 to obtain authentication to the on-premise application and perform the tasks needed to obtain access to the on-premise application via the Kerberos protocol. In another aspect, an agent 142 residing on the user device may perform the authentication tasks. The agent 142 may interact with the identity server, extract the Kerberos ticket from the access token and send the Kerberos ticket to the on-premise server. The agent then provides the client application with access to the on-premise application.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2:
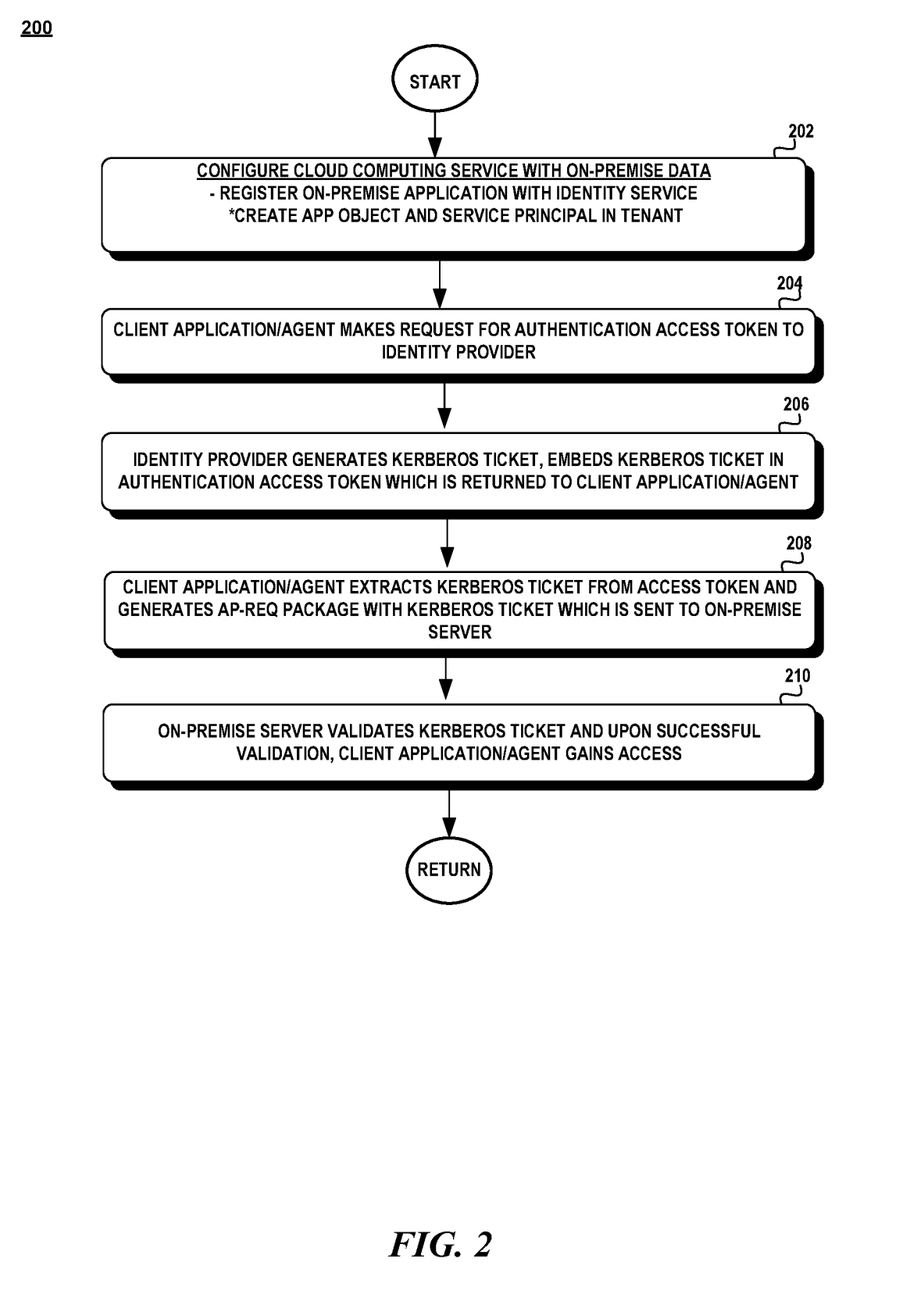
FIG. 2 is a flow diagram illustrating an exemplary method of the cloud computing service to authenticate the identity of a user or application requesting access to an on-premise application.
Figure 3:
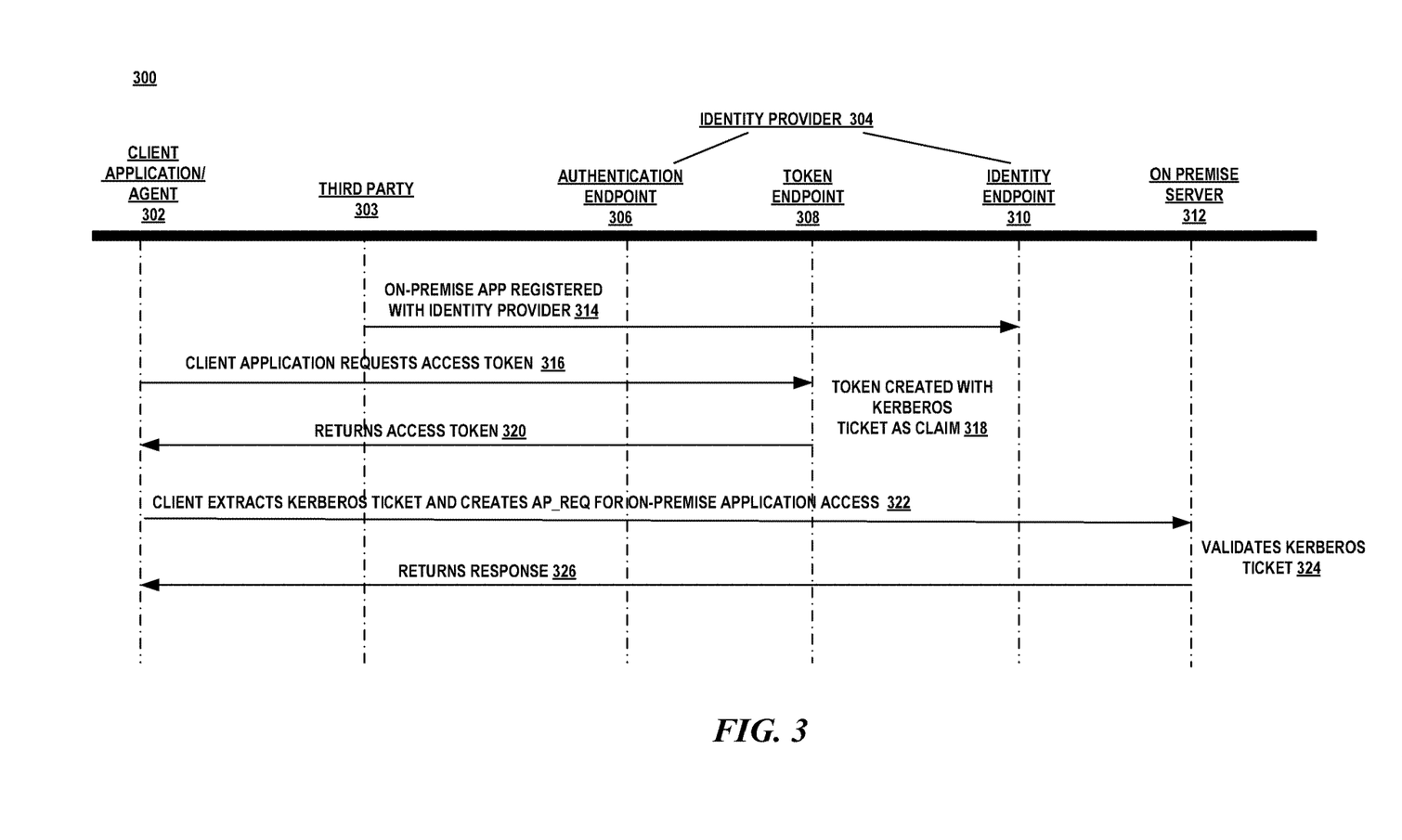
FIG. 3 is a block diagram illustrating an exemplary flow of the interactions between the components of the cloud computing service and the on-premise server to authenticate access to an on-premise application.

FIG. 2 illustrates an exemplary method 200 for accessing a Kerberos-authenticated on-premise application using a cloud-based authentication protocol. FIG. 3 illustrates the authentication flow 300 between the client application/agent (i.e., user device) 302, the identity provider 304 using an authentication endpoint 306, a token endpoint 308, an identity endpoint 310, and the on-premise server 312.

Referring to FIGS. 2 and 3, in order to delegate identity and access management functions to the cloud computing service, the on-premise application needs to be registered with the cloud computing service. On-premise data associated with the on-premise application is stored in the tenant of the cloud computing service and contains data for authenticating users to access the on-premise application. (Collectively, FIG. 2, block 202, FIG. 3, line 314).

In one aspect, a third-party 303, such as an automated tool or an administrator, registers the on-premise application with the identity provider 304 through a request to the identity endpoint 310. The identity service generates on-premise data for the on-premise application. The on-premise data includes an application object for the on-premise application, which contains a service principal object, that is stored in a tenant of the resource owner of the on-premise application. (Collectively, FIG. 2, block 202, FIG. 3 line 314).

An application object is a globally unique identifier for the on-premise application. An application object is used as a template to create one or more service principal objects. A service principal object is created in every tenant where the on-premise application is used. The service principal object defines the access policy including the authentication protocol used by a resource. A service principal object is the local representation, or application instance, of an application object in a single tenant or directory.

The service principal object defines what the on-premise application can actually do in the specific tenant, who can access the on-premise application, and what resources the on-premise application can access. The service principal object includes a service principal name. A service principal name (SPN) is a unique identifier of an instance of the on-premise application. Additionally, the service principal object contains the cryptographic keys (e.g., secret key) used to access the on-premise application via the Kerberos authentication protocol. (Collectively, FIG. 2 block 202, FIG. 3 line 314).

The storage of the on-premise data in the cloud computing service ensures that the on-premise application is not altered when authentication of the on-premise application is moved to the cloud computing service and also ensures that the on-premise application utilizes its existing authentication protocol. The on-premise data also contains the configuration settings and keys used in the Kerberos authentication thereby establishing a trust between the cloud computing service and the domain directory service. (Collectively, FIG. 2, block 202, FIG. 3, line 314).

Using the OAuth/OIDC protocol, the authentication process starts with the client application/agent 302 issuing a request to the token endpoint 308 of the identity provider for an authentication access token to access the on-premise application with one or more permissions. The request includes the service principal name associated with the on-premise application and a unique identifier of the requestor. (Collectively, FIG. 2, block 204, FIG. 3, line 316).

The identity provider 304 authenticates the client application or agent issuing the request and upon successful validation, the identity provider 304 generates an access token with a Kerberos ticket. The identity service invokes the ticket granting service of the cloud computing service's Kerberos key distribution center to generate a Kerberos ticket. The Kerberos ticket is embedded into the access token as a claim and returned to the client application. (Collectively, FIG. 2, block 206, FIG. 3, lines 318-320).

Upon receiving the access token, the client application/agent 302 extracts the Kerberos ticket from the access token and generates a Kerberos AP_REQ package. The AP_REQ package includes the Kerberos ticket. (Collectively, FIG. 2, block 208, FIG. 3, line 322).

The AP_REQ package is sent to the on-premise server 312. The server 312 validates the Kerberos ticket and upon successful validation, returns an AP_REP package. The AP_REP package is an acknowledgment which enables the client application 302 with access to the on-premise application (Collectively, FIG. 2, block 210, FIG. 3, lines 324-326).

Exemplary Operating Environment

Figure 4:
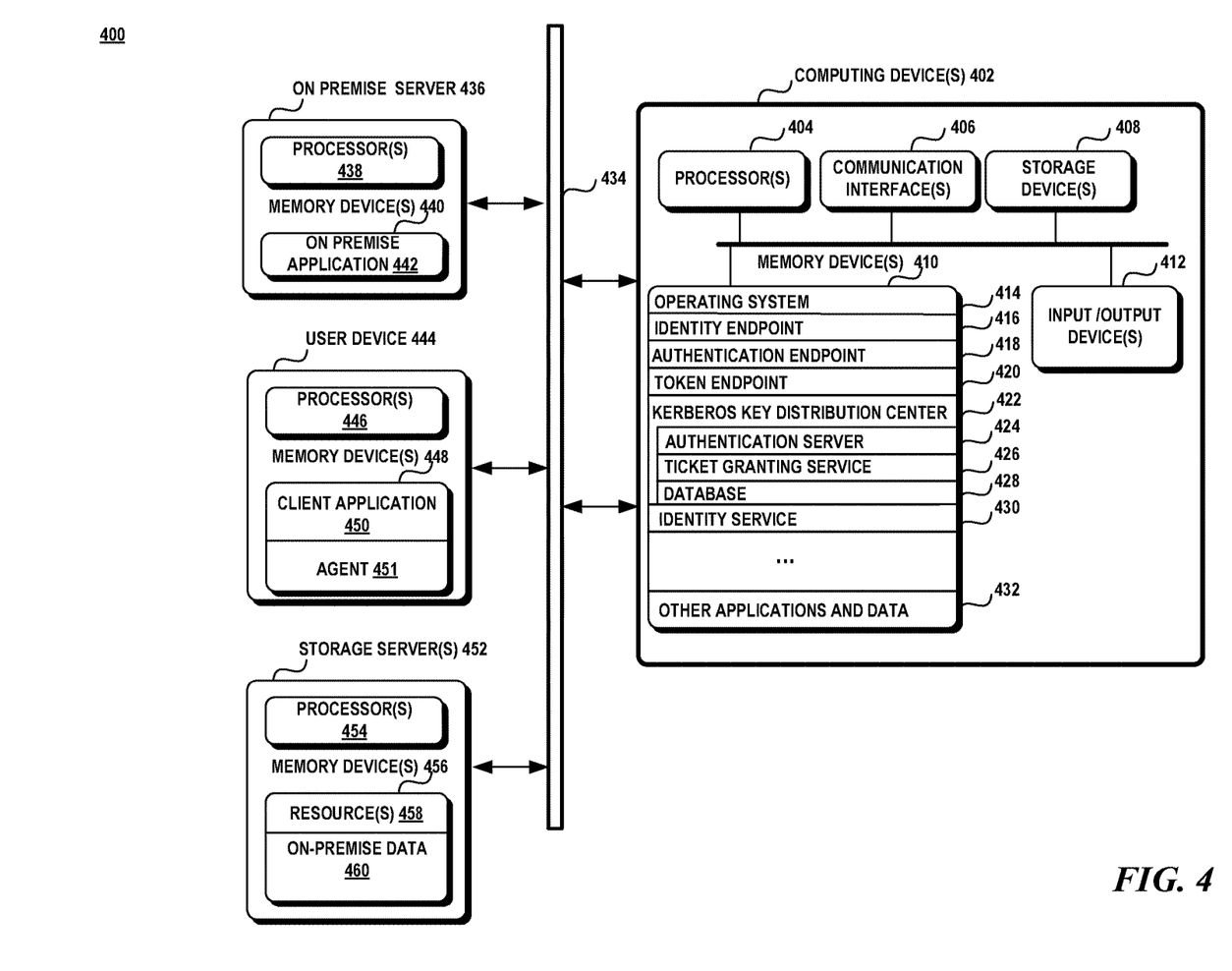
FIG. 4 is a block diagram illustrating an exemplary operating environment.

Attention now turns to a discussion of an exemplary operating embodiment. Turning to FIG. 4, the aspects may be applied to an operating environment 400 that utilizes one or more computing devices 402 of a cloud computing service, an on-premise server 436, a user device 444, and one or more storage servers 452. The computing devices 402, the on-premise server 436, the user device 444 and the one or more storage servers 452 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 400 may be configured in a network environment, a distributed environment, a multi-processor environment, or a stand-alone computing device having access to remote or local storage devices.

Each of the computing devices 402, the on-premise server 436, the user device 444 and the one or more storage servers 452 includes one or more processors 404, 438, 446, 454 and memory devices 410, 440, 448, 456. A processor 404, 438, 446, 454 may be any commercially available or customized processor and may include dual microprocessors and multi-processor architectures.

Computing device 402 include one or more communication interfaces 406, one or more storage devices 408 and input/output devices 412. The communication interface 406 facilitates wired or wireless communications between a computing device 402 and other devices. A storage device 408 may be computer-readable medium that does not contain propagating signals, such as modulated data signals transmitted through a carrier wave. Examples of a storage device 408 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 408 in the computing devices 402. The input/output devices 412 may include a keyboard, mouse, pen, voice input device, touch input device, display, speakers, printers, etc., and any combination thereof.

The memory devices 410, 440, 448, 456 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory devices 410, 440, 448, 456 may also include one or more external storage devices or remotely located storage devices that do not pertain to propagated signals, such as modulated data signals transmitted through a carrier wave.

Memory device 410 contains instructions, components, and data. The memory device 410 includes an operating system 414, an identity endpoint 416, an authentication endpoint 418, a token endpoint 420, a Kerberos key distribution center 422 having an authentication server 424, a ticket granting service 426, and database 428, an identity service 430 and other applications and data 432. Memory device 440 includes the on-premise application 442, memory device 448 includes the client application 450 and agent 451, and memory device 456 contains the resources 458 and on-premise data 460.

The computing devices 402, the on-premise server 436, the user device 444 and the one or more storage servers 452 communicate through a network 434. The network 434 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

CONCLUSION

A system is disclosed comprising: at least one processor; and a memory that stores one or more programs that are configured to be executed by the one or more processors, the one or more programs including instructions that: transmit a first request to authenticate a client application, to access an on-premise application, the first request sent to an identity provider of a cloud computing service, the first request made through a cloud-based network authentication protocol, the on-premise application subject to a legacy network authentication protocol, the cloud-based network authentication protocol incompatible with the legacy network authentication protocol; in response to the first request, obtain a security token including a security ticket of the legacy network authentication protocol, the security ticket generated by the identity provider of the cloud computing service, the security token associated with the cloud-based network authentication protocol; transmit an authentication request using the legacy network authentication protocol to the on-premise application, the authentication request including the security ticket; and obtain access to the on-premise application.

In one aspect, the one or more programs include further instructions that: extract the security ticket from the security token; and embed the security ticket into the authentication request. In an aspect, the on-premise application is part of a private domain directory service. In aspects, the security token is a JavaScript Object Notation (JSON) web token, the security ticket is embedded as a claim in the security token, the legacy network authentication protocol is based on Kerberos, and the cloud-based network authentication protocol is based on OpenId Connect.

A method is disclosed, comprising: requesting authentication to access an on-premise application from a cloud computing service using a cloud-based authentication protocol, wherein the on-premise application adheres to a legacy authentication protocol, the cloud-based authentication protocol adheres to a cloud-based authentication protocol, the legacy authentication protocol differs from the cloud-based authentication protocol; receiving a security token including a security ticket of the legacy network authentication protocol, the security ticket generated by an identity provider of the cloud computing service, the security token associated with the cloud-based network authentication protocol; transmitting an authentication request using the legacy network authentication protocol to the on-premise application, the authentication request including the security ticket; and obtaining access to the on-premise application.

In one aspect, the method further comprises: extracting the security ticket from the security token; and embedding the security ticket into the authentication request. In one or more aspects, the on-premise application resides in a domain directory service outside of the cloud computing service, the security token is a JavaScript Object Notation (JSON) web token, the security ticket is embedded as a claim in the security token, the legacy network authentication protocol is based on Kerberos, and the cloud-based network authentication protocol is based on OpenId Connect.

A device is disclosed, comprising: at least one processor and a memory; wherein the at least one processor is configured to: receive an authentication request, at a cloud computing service, for access to an on-premise application, the authentication request associated with a cloud-based authentication protocol from a client application, the on-premise application associated with a legacy authentication protocol, the cloud-based authentication protocol differs from the legacy authentication protocol; upon successful verification of the authentication request, generate an authentication token of the cloud-based authentication protocol having an authentication ticket of the legacy authentication protocol; and provide the authentication token to the client application to authenticate to the on-premise application through the legacy authentication protocol using the authentication ticket.

In one or more aspects, the on-premise application resides in a domain outside of the cloud computing service, the cloud-based authentication protocol is based on Oauth/OIDC protocol, and the legacy authentication protocol is Kerberos-based.

In an aspect, the at least one processor is further configured to: configure the cloud computing service with on-premise data of the on-premise application, the on-premise data specifying the legacy authentication protocol of the on-premise application. In an aspect, the at least one processor is further configured to: configure the cloud computing service with a ticket granting service that generates the security ticket.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A system, comprising:
at least one processor; and
a memory that stores one or more programs that are configured to be executed by the one or more processors, the one or more programs including instructions to perform actions that:
transmit, from a client application, a first request to authenticate the client application to access an on-premise application, the first request sent to an identity provider of a cloud computing service, the first request made through a cloud-based network authentication protocol, the on-premise application subject to a Kerberos authentication protocol, the cloud-based network authentication protocol incompatible with the Kerberos authentication protocol;
in response to a successful authentication of the client application, obtain, at the client application, a security token including at least one claim, wherein the at least one claim includes a Kerberos security ticket of the Kerberos authentication protocol, wherein a claim identifies a granted permission to a resource, the Kerberos security ticket generated by a Kerberos Key Distribution Center included in the identity provider of the cloud computing service, the security token associated with the cloud-based network authentication protocol;
extract, at the client application, the Kerberos security ticket from the security token;
transmit, from the client application, a Kerberos authentication request using the Kerberos authentication protocol to a second Kerberos Key Distribution Center comprising a Kerberos authorization server of the on-premise application, the Kerberos authentication request including the Kerberos security ticket; and
in response to a successful validation of the Kerberos security ticket, obtain, by the client application, access to the on-premise application.

2. The system of claim 1, wherein the cloud-based network authentication protocol comprises Security Assertion Markup Language (SAML) protocol.

3. The system of claim 1, wherein the on-premise application is part of a private domain directory service.

4. The system of claim 1, wherein the security token is a JavaScript Object Notation (JSON) web token.

5. The system of claim 1, wherein the cloud-based network authentication protocol comprises the Web Services Federation protocol.

6. The system of claim 1, wherein the client application communicates with the cloud computing service through Representational State Transfer (REST) Application Programming Interfaces (APIs).

7. The system of claim 1, wherein the cloud-based network authentication protocol is based on OpenId Connect.

8. A computer-implemented method, comprising:
requesting, from a client application, authentication to access an on-premise application from a cloud computing service using a cloud-based authentication protocol, wherein the on-premise application adheres to a Kerberos authentication protocol, the cloud-based authentication protocol adheres to a cloud-based authentication protocol, the Kerberos authentication protocol differs from the cloud-based authentication protocol;
upon successful authentication of the client application, receiving, at the client application, a security token including at least one claim, wherein the at least one claim represents a granted permission to a resource, wherein the at least one claim includes a Kerberos security ticket of the Kerberos authentication protocol, the Kerberos security ticket generated by a Kerberos Key Distribution Center included in an identity provider of the cloud computing service, the security token associated with the cloud-based network authentication protocol;

extracting, at the client application, the Kerberos security ticket from the security token;

transmitting, from the client application, an authentication request using the Kerberos authentication protocol to a second Kerberos Key Distribution Center comprising a Kerberos authorization server of the on-premise application, the Kerberos authentication request including the Kerberos security ticket; and in response to a successful validation of the Kerberos security ticket, obtaining by the client application, access to the on-premise application.

9. The method of claim 8, wherein the client application communicates with the cloud computing service through Representational State Transfer (REST) Application Programming Interfaces (APIs).

10. The method of claim 8, wherein the on-premise application resides in a domain directory service outside of the cloud computing service.

11. The method of claim 8, wherein the security token is a JavaScript Object Notation (JSON) web token.

12. The method of claim 8, wherein the cloud-based authentication protocol is based on Oauth/OpenIDConnect (OIDC) protocol.

13. The method of claim 8, wherein the cloud-based authentication protocol is based on a Security Assertion Markup Language (SAML) protocol or a Web Services Federation protocol.

14. The method of claim 8, wherein the cloud-based network authentication protocol is based on OpenId Connect.

15. A device, comprising:
at least one processor and a memory;
wherein the at least one processor is configured to perform actions that:
receive an authentication request, at a cloud computing service, for access to an on-premise application, the authentication request associated with a cloud-based authentication protocol from a client application, the on-premise application associated with a Kerberos authentication protocol, the cloud-based authentication protocol differs from the Kerberos authentication protocol; and upon successful verification of the authentication request:
generate a Kerberos security ticket of the Kerberos authentication protocol from a Kerberos Key Distribution Center included in the identity provider of the cloud computing service and generate an authentication token, wherein the authentication token is of the cloud-based authentication protocol and includes a plurality of claims, wherein at least one claim identifies a granted permission to a resource, wherein the at least one claim includes the Kerberos security ticket; and provide the authentication token to the client application, wherein the client application authenticates to the on-premise application through the Kerberos authentication protocol by extracting the Kerberos security ticket from the authentication token, and providing the Kerberos security ticket to a second Kerberos Key Distribution Center comprising a Kerberos authentication server of the on-premise application, wherein the client application obtains access to the on-premise application in response to a successful validation of the Kerberos security ticket.

16. The device of claim 15, wherein the on-premise application resides in a domain outside of the cloud computing service.

17. The device of claim 15, wherein the at least one processor is further configured to perform actions that:
configure the cloud computing service with on-premise data of the on-premise application, the on-premise data specifying the Kerberos authentication protocol of the on-premise application.

18. The device of claim 15, wherein the cloud-based network authentication protocol comprises Security Assertion Markup Language (SAML) protocol.

19. The device of claim 15, wherein the cloud-based authentication protocol is based on Oauth/OpenIDConnect (OIDC) protocol.

20. The device of claim 15, wherein the Kerberos security token comprises a JavaScript Object Notation (JSON) web token.

* * * * *